United States Patent [19]
Furukoshi

[11] Patent Number: 5,241,248
[45] Date of Patent: Aug. 31, 1993

[54] WIPER CONTROLLER

[75] Inventor: Hiroyuki Furukoshi, Toyohashi, Japan

[73] Assignee: Asmo Co., Ltd., Kosai, Japan

[21] Appl. No.: 917,483

[22] Filed: Jul. 20, 1992

[30] Foreign Application Priority Data

Jul. 22, 1991 [JP] Japan .................. 3-181366

[51] Int. Cl.⁵ .............................. B60S 1/08
[52] U.S. Cl. .......................... 318/444; 318/DIG. 2
[58] Field of Search ............... 318/443, 444, DIG. 2; 15/250 R, 250.12

[56] References Cited

U.S. PATENT DOCUMENTS

| | | | |
|---|---|---|---|
| 3,564,374 | 2/1971 | Kearns | 318/443 |
| 3,573,584 | 4/1971 | Kearns | 318/443 X |
| 3,581,178 | 5/1971 | Kearns | 318/443 |
| 3,614,573 | 10/1971 | Rieman | 318/443 |
| 3,633,085 | 1/1972 | Rouvre | 318/443 |
| 3,681,620 | 8/1972 | Hoge | 307/271 |
| 4,689,535 | 8/1987 | Tsunoda et al. | 318/443 |

FOREIGN PATENT DOCUMENTS

| | | |
|---|---|---|
| 57-58535 | 4/1982 | Japan . |
| 60-189664 | 9/1985 | Japan . |
| 62-182863 | 11/1987 | Japan . |

*Primary Examiner*—Bentsu Ro
*Attorney, Agent, or Firm*—Stetina & Brunda

[57] ABSTRACT

A wiper controller comprises a power source, a wiper drive mechanism, a power storage device having one potential detecting point, a charge circuit connected between the storage device and the power source, for charging the storage device. A discharge circuit is provided in parallel with the storage device for discharging the storage device. A drive control device controls the wiper through the drive mechanism. Either the charge circuit or the discharge circuit includes a switch for disconnecting that circuit. The other circuit includes a resistor for determining a corresponding charge or discharge time and for respectively charging or discharging the storage device. The present wiper controller further includes a switch control device for controlling the switch. The drive control device allows the wiper to reciprocate, when the potential at the detecting point reaches a predetermined value. The switch control device sets the switch on for a predetermined period of time after one reciprocative action of the wiper is completed, so that the battery is charged (or discharged) to initialize the potential at the detecting point.

20 Claims, 7 Drawing Sheets

WIPER CONTROLLER

BACKGROUND OF THE INVENTION

This application claims the priority of Japanese Patent Application No. 3-181366 filed on Jul. 22, 1991, which is incorporated herein by reference.

1. Field of the Invention

The present invention generally relates to a wiper controller for controlling a wiper used in a vehicle. More particularly, the present invention is directed to a wiper controller which drives the wiper intermittently.

2. Description of the Related Art

A conventional wiper controller is capable of selectively setting a fast wiping mode, a slow wiping mode, and an intermittent mode for intermittently moving the wiper at predetermined intervals. Several wiper controllers have been developed to control the intermittent inactive time of the wiper when the intermittent mode is selected.

Japanese Unexamined Patent Publication No. 60-189664 discloses such a wiper controller which is capable of setting the inactive time in the intermittent wiper action to an arbitrary value within a few seconds. This wiper controller comprises a control processor, a variable resistor and a multivibrator circuit. The multivibrator circuit has a plurality of resistors and capacitors, as well as at least two transistors which are alternately turned on and off based on an input signal to the multivibrator circuit. The multivibrator circuit outputs a signal having a pulse width corresponding to the set value of the variable resistor. The control processor controls the intermittent action of the wiper based on that output signal.

FIG. 9 of the drawings shows another conventional wiper controller. This wiper controller includes a control processor 21, a variable resistor 22, and an oscillation circuit 20. The oscillation circuit 20 comprises a plurality of resistors, capacitors and transistors, and outputs a pulse signal having a predetermined waveform. The control processor 21 controls the intermittent action of the wiper based on the output signal. When the variable resistor 22 is adjusted, the period of the pulse signal output from the oscillation circuit is changed, thereby altering and setting the intermittent inactive time of the wiper.

However, both types of conventional wiper controllers require a relatively large number of electronic components to form the multivibrator circuit or the oscillation circuit 20. In addition, the latter type, which is equipped with the oscillation circuit 20 suffers the unstable oscillation frequency of the output signal of the oscillation circuit 20, as well as from the difficulty in setting a constant oscillation for the oscillation circuit 20. This inevitably results in a large variation in the intermittent inactive time of the wiper, and disables the intermittent wiper action at accurate time intervals.

SUMMARY OF THE INVENTION

Accordingly, it is a primary objective of the present invention to provide a wiper controller which ensures stable intermittent wiper action. The wiper controller has a simple design requiring fewer electronic components.

To achieve the foregoing and other objects in accordance with the purpose of the present invention, there is provided an improved wiper controller which includes a power source, and a drive mechanism for driving a wiper. A power storage device has one potential detecting point, and a charge circuit connects the storage device to the power source to cause the storage device to be charged by the power source. A discharge circuit is provided in parallel with the storage device for discharging the storage device. A drive control device controls the wiper through the drive mechanism.

Either the charge circuit or the discharge circuit includes a switch for disconnecting that circuit. The other circuit includes a resistor for determining a corresponding charge or discharge time and for respectively charging or discharging the battery. The present wiper controller further includes a switch control device for controlling the switch.

The drive control device allows the wiper to reciprocate when the potential at the detecting point reaches a predetermined value by the discharging (or charging) of the storage device. The switch control device sets the switch on for a predetermined period of time after one reciprocative action of the wiper is completed, so that the storage device is charged (or discharged) to initialize the potential at the detecting point.

It is preferable that the wiper controller include a counter for counting the number of times the switch is set on by the switch control device. The switch control device is designed to set the switch on for a predetermined period of time when the potential at the detecting point reaches a predetermined level by the discharging (or charging) of the storage device, so that the storage device is charged (or discharged) to initialize the potential at the detecting point. Further, the drive control device is designed to cause the wiper to make one reciprocative action when the count value of the counter reaches a predetermined value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 1 and 2 illustrate a first embodiment of the present invention, wherein:

FIG. 1 illustrates a circuit diagram for use in a wiper controller; and

FIG. 2 is a flowchart illustrating the process of controlling the wiper of FIG. 1;

FIGS. 3 through 7 illustrate a second embodiment of the present invention, wherein:

FIG. 3 illustrates a circuit diagram for use in a wiper controller; and

FIGS. 4 through 7 are flowcharts illustrating the process of controlling the wiper of FIG. 3;

DETAILED DESCRIPTION OF THE PREFERRED EMBODIMENTS

A first embodiment of the present invention will now be described with reference to FIGS. 1 and 2.

Figure 1:
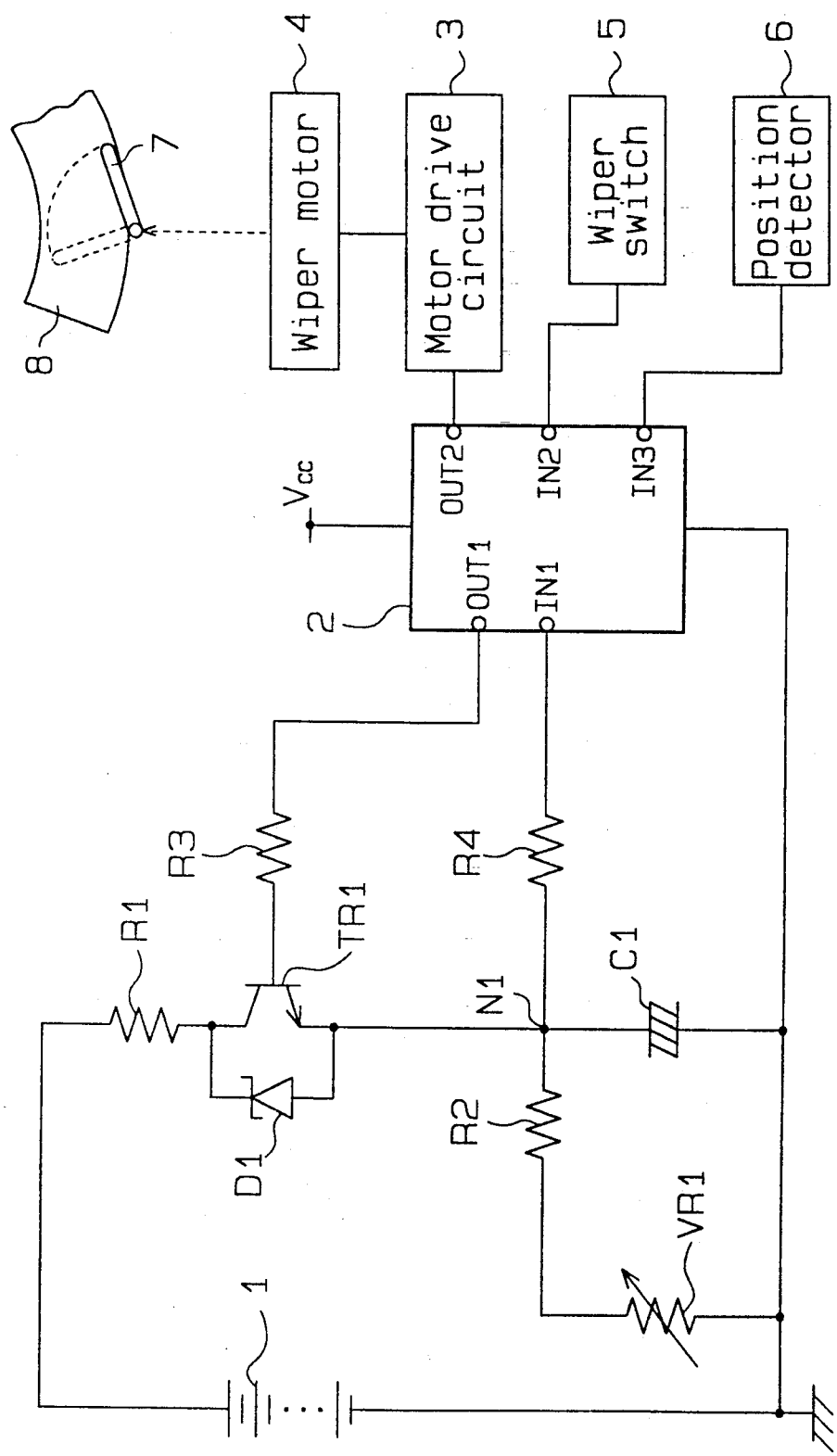
Figure 2:
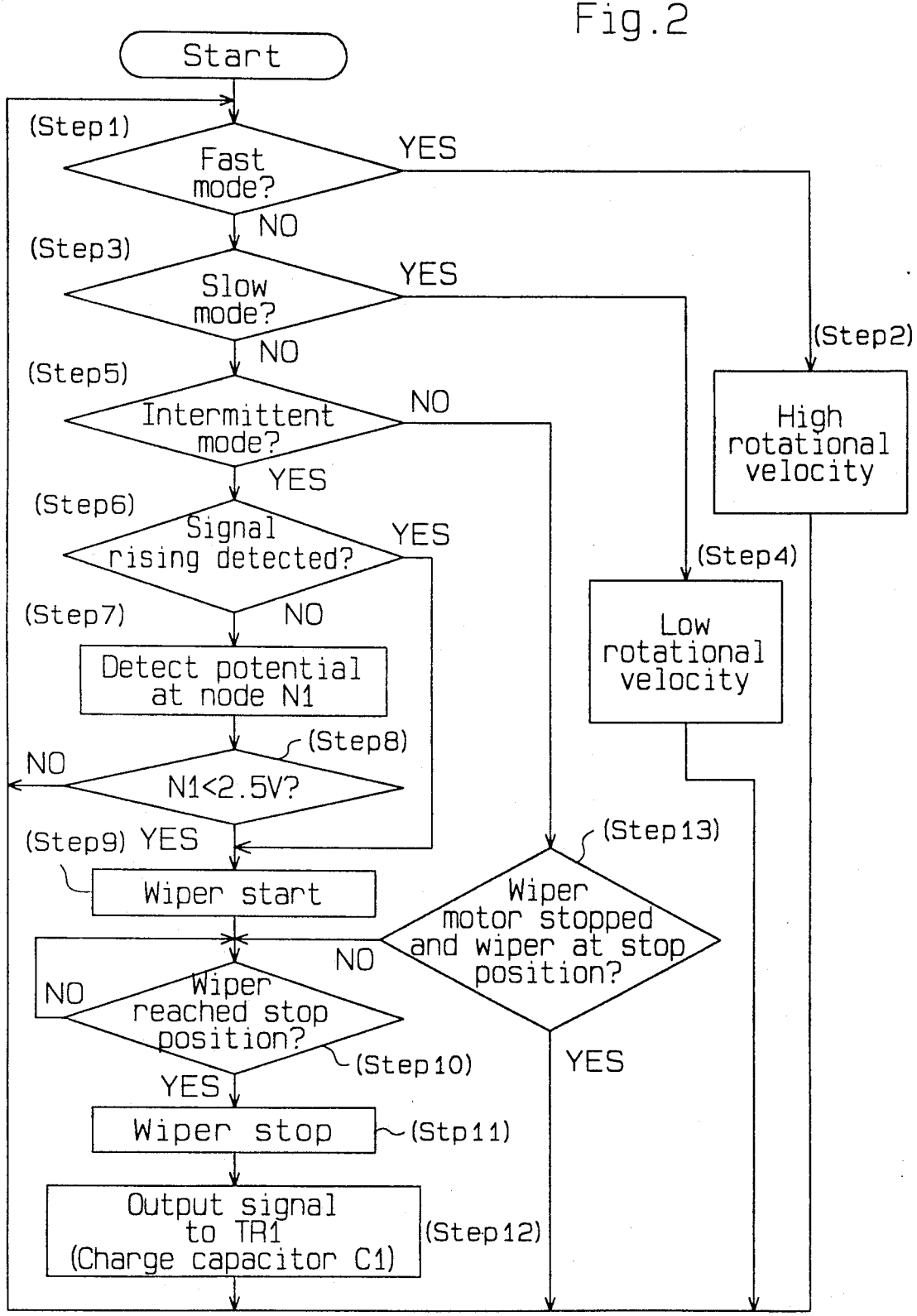

FIG. 1 shows a wiper controller for use in a wiper 7 which wipes a windshield 8 of a vehicle. The wiper controller comprises a wiper motor 4, a control processor 2 and a battery 1 as a first power source.

A resistor R1, a transistor TR1 which acts as a switching element, and a capacitor C1, are connected in series to the battery 1. The negative terminal of the battery 1 is connected to ground potential. A Zener diode D1 is connected between the collector and emitter of the transistor TR1, for protecting the transistor TR1 against a surge produced by an external device or electrical component (not shown) connected to the battery 1. A resistor R2 and a variable resistor VR1 are connected in series to each other, and are further connected in parallel to the capacitor C1.

The control processor 2 operates on power from a second power source $_{cc}$ such as 5 volts, to perform arithmetic operations based on various input signals. The control processor 2 outputs control signals. It has three input terminals IN1, IN2 and IN3 and two output terminals OUT1 and OUT2.

The output terminal OUT2 of the control processor 2 is connected to the wiper motor 4 via a motor drive circuit 3 having a relay (not shown). The motor drive circuit 3 controls the power supply to the wiper motor 4, in order to drive the wiper 7 in accordance with the output control signal from the control processor 2.

The input terminal IN2 of the control processor 2 is connected to a wiper switch 5. This wiper switch 5 can be switched to three positions respectively corresponding to a fast mode for fast movement of the wiper 7, a slow mode for slow movement of the wiper 7, and an intermittent mode for intermittent movement of the wiper for every predetermined period of time. The input terminal IN3 of the control processor 2 is connected to a position detector 6. Based on a detection signal from the position detector 6, the control processor 2 detects the position of the wiper 7 on the windshield 8 or the stop position.

The input terminal IN1 of the control processor 2 is connected, via a resistor R4, to a node N1 between the emitter of the transistor TR1 and the capacitor C1. The control processor 2 therefore detects the potential of the node N1.

The output terminal OUT1 of the control processor 2 is connected, via a resistor R3, to the base of the transistor TR1. The control processor 2 outputs a high-level signal from the output terminal OUT1 for a predetermined period of time (1 ms in this embodiment) under given conditions, to turn on the transistor TR1 for that period of time.

When the transistor TR1 is turned on, the capacitor C1 is charged by the battery 1, thus permitting the potential at the node N1 to reach a predetermined high potential. When the transistor TR1 is turned off after the predetermined period of time elapses, the charges accumulated in the capacitor C1 are gradually discharged, via the resistor R2 and variable resistor VR1, for lowering the potential at the node N1.

When the control processor 2 detects that the potential at the node N1 falls below a predetermined discrimination potential (2.5 volts in this embodiment), due to the discharging of the capacitor C1 triggered by the turn-off of the transistor TR1, the control processor 2 allows the wiper 7, through the motor drive circuit 3 to make one reciprocative action. When the control processor 2 detects that the wiper 7 has returned to the stop position, based on the signal from the position detector 6, it causes the wiper motor 4 to stop. The control processor 2 simultaneously sends a high-level signal again to the transistor TR1 in an OFF state, to turn it on, and to cause the capacitor C1 to be recharged.

In this manner, the control processor 2 controls the intermittent driving of the wiper 7, while measuring the time duration for stopping the wiper 7, in accordance with the repetitive charging and discharging of the capacitor C1. Although the aforementioned discrimination potential is set to half the power of the second power source $V_{cc}$, it may be set to another value.

The general operation of the wiper controller according to this embodiment will now be described with reference to the flowchart of FIG. 2.

The control processor 2 initially determines whether the wiper switch 5 is set in the fast mode (step 1). When the wiper switch 5 is set in the fast mode, the control processor 2 instructs the motor drive circuit 3 to cause the wiper motor 4 to rotate at a higher velocity (step 2).

When the wiper switch 5 is not set in fast mode, the control processor 2 determines whether the wiper switch 5 is set in the slow mode (step 3). If the wiper switch 5 is set in the slow mode, the control processor 2 instructs the motor drive circuit 3 to cause the wiper motor 4 to rotate at a lower velocity (step 4).

If the wiper switch 5 is not set in the slow mode, the control processor 2 determines whether the wiper switch 5 is set in the intermittent mode (step 5). If the wiper switch 5 is set in the intermittent mode, the control processor 2 checks if the rising of a signal at the time of switching the wiper switch 5 to the intermittent mode is detected (step 6). When the rising of the signal is detected, the control processor 2 considers that the wiper switch 5 has just been switched to the intermittent mode. If no signal rising is detected, the control processor 2 considers that the intermittent mode has been selected.

When the intermittent mode has been selected, the control processor 2 detects the potential at the node N1, via the resistor R4 (step 7). Subsequently, the control processor 2 determines whether the potential at the node N1 is lower than 2.5 volts (step 8). If the potential at the node N1 is equal to, or higher than 2.5 volts, the control processor 2 returns to step 1 and performs the same control sequence as described above. When the potential at the node N1 is less than 2.5 volts, the control processor 2 causes the motor drive circuit 3 and wiper motor 4 to activate the wiper 7 (step 9).

The control processor 2 then determines whether the wiper 7 has reached a predetermined stop position based on the detection signal from the position detector 6 (step 10). When the wiper 7 has reached the predetermined stop position, the control processor 2 stops moving the wiper 7 (step 11). The wiper 7 makes one reciprocative action through the control sequence from step 9 to step 11.

After stopping the wiper 7 at the stop position, the control processor 2 applies a pulse signal to the base of the transistor TR1, via the resistor R3 for a predetermined period of time, such as 1 millisecond (step 12). This pulse signal sets the transistor TR1 on, and charges the capacitor C1. One millisecond is sufficient time to complete the charging of the capacitor C1. As a result, the potential at the node N1 returns to a predetermined high potential (5 volts). Thereafter, the control processor 2 returns to step 1 again and repeats the above-described control sequence.

When the signal rising due to the setting of the wiper switch 5 in the intermittent mode, is detected, (i.e., immediately after the mode switching to the intermittent mode) in step 6, the control processor 2 promptly advances to step 9 to activate the wiper 7, immediately. Thereafter, the control processor 2 controls the wiper 7 according to the procedures starting from step 10 as described above.

It may be determined in step 5 that the wiper switch 5 is not set in the intermittent mode. This happens when the wiper switch 5 has not originally been set in any mode, or when the wiper switch 5 is switched off from the intermittent mode. In such a case, the control processor 2 determines whether the wiper motor 4 is stopped, and determines whether the wiper 7 is in the stop position, based on the detection signal from the position detector 6 (step 13).

If the wiper motor 4 is not operating, and the wiper 7 is stopped at the predetermined stop position, the control processor 2 returns to step 1, to repeat the above-described control sequence. When the wiper 7 is not in the predetermined stop position, the control processor 2 controls the wiper 7 according to the procedures starting from step 10, and causes the wiper 7 to stop at the predetermined stop position.

This embodiment requires significantly fewer electronic components, to form a circuit for stopping the wiper at given time intervals, than those needed by prior art devices. The wiper controller of the present invention can be made simpler and more compact than the conventional wiper controller. In addition, the reduction in the number of required electronic components lowers the signal transmission loss, thus accomplishing accurate control of the intermittent wiper action.

According to this embodiment, the time from a point at which the output of the control signal from the output terminal OUT1 has started or ended, to a point when the positive side potential of the capacitor C1 (the potential at the node N1) drops to the predetermined discrimination potential (2.5 volts) is used as the stop or inactive duration of the wiper motor 4. The discharging time of the capacitor C1 can therefore be made longer or shorter by varying the resistance of the variable resistor VR1. The inactive time of the wiper motor 4 can be adjusted accordingly.

A second embodiment of the present invention will be discussed below with reference to FIGS. 3 through 7. In the following description, those components in the second embodiment which are identical to, or function in a similar manner as the components of the first embodiment will be given the same numeral references.

Figure 3:
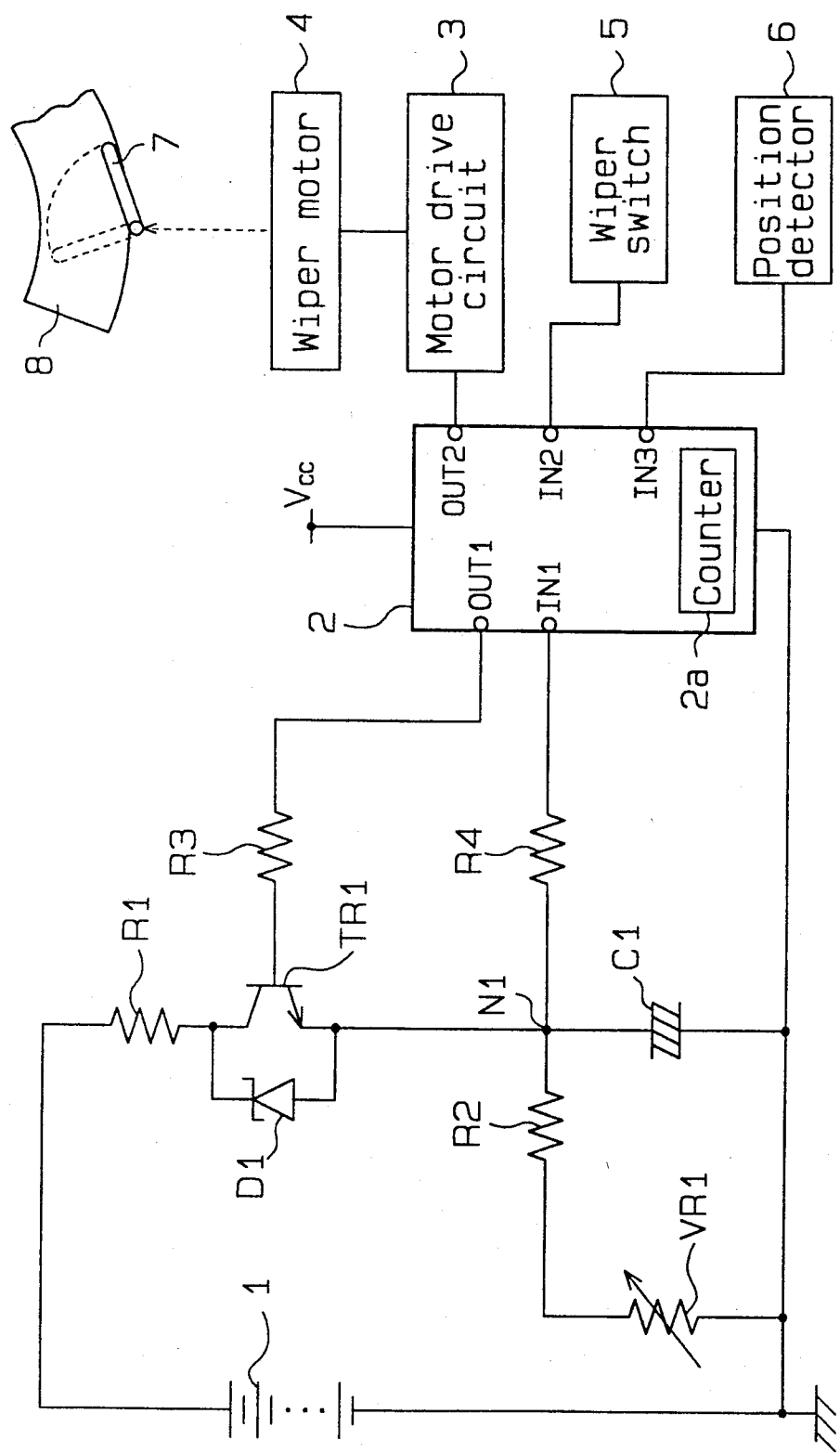
Figure 4:
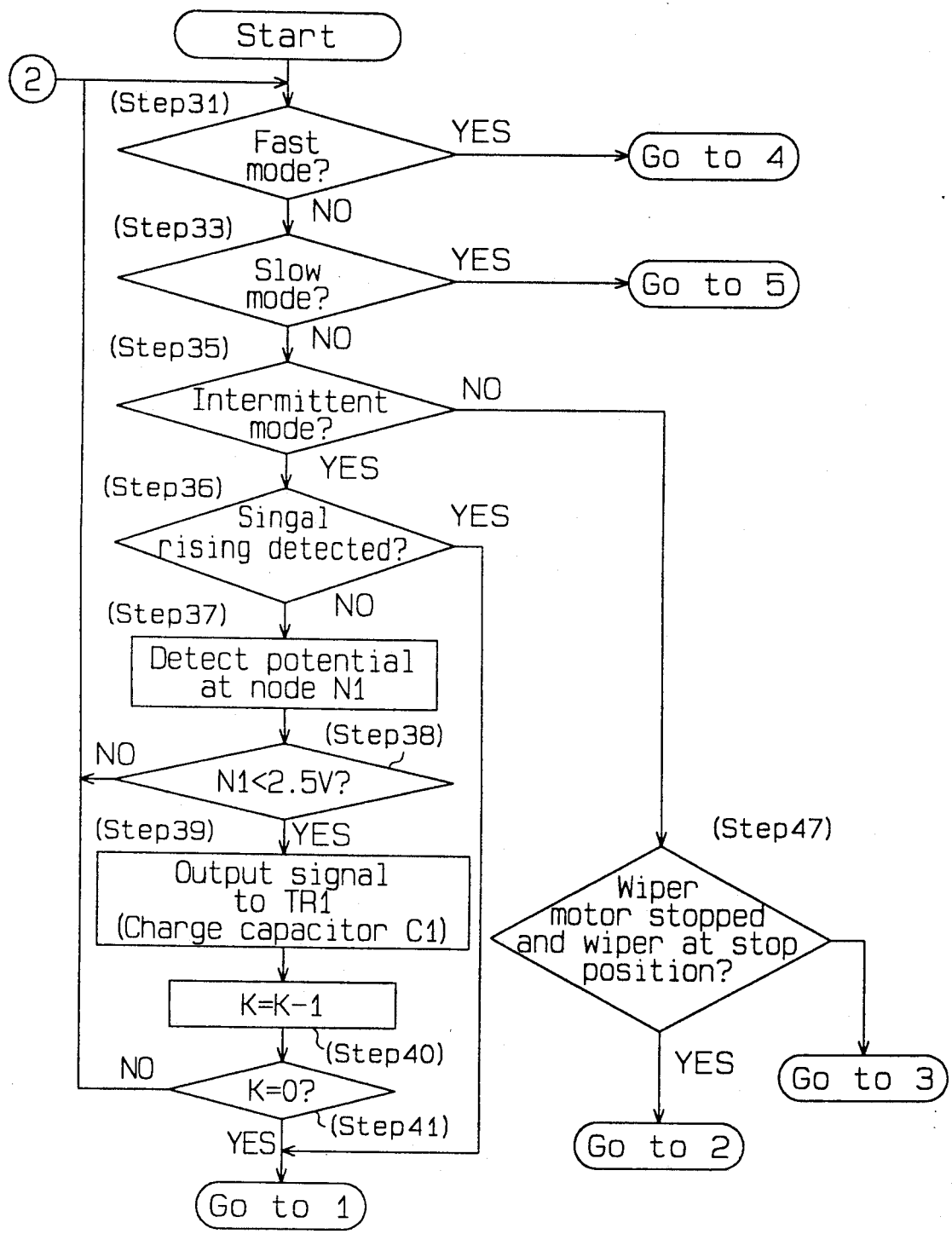

As shown in FIG. 3, the control processor 2 according to the second embodiment includes a counter 2a whose count value K is incremented or decremented in accordance with the number of times the transistor TR1 is turned on (the number of times the capacitor C1 is charged) by the control processor 2. In this embodiment, the counter 2a is designed to decrement the count value K every time the transistor TR1 is turned on. When the count value, which is preferably initialized at "30", coincides with a discrimination count value (K=0), the control processor 2 allows the wiper 7 through the motor drive circuit 3 to make one reciprocative action.

The general action of the wiper controller according to this embodiment will be described with reference to the flowcharts in FIGS. 4 through 7.

Figures 6, 7:
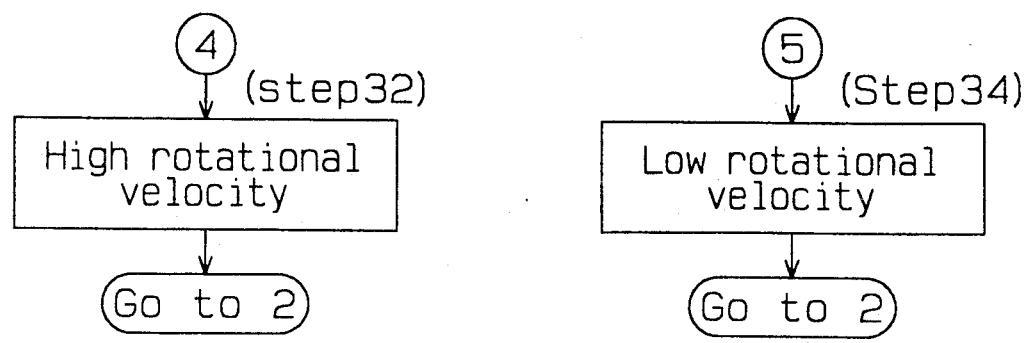

The control processor 2 initially determines whether the wiper switch 5 is set in the fast mode (step 31). If the wiper switch 5 is set in the fast mode, the control processor 2 instructs the motor drive circuit 3 to cause the wiper motor 4 to rotate at a higher velocity, as illustrated in FIG. 6 (step 32).

If it is determined that the wiper switch 5 is not set in the fast mode, the control processor 2 determines whether the wiper switch 5 is set in the slow mode (step 33). If the wiper switch 5 is set in the slow mode, the control processor 2 instructs the motor drive circuit 3 to cause the wiper motor 4 rotate at a lower velocity, as illustrated in FIG. 7 (step 34).

If the wiper switch 5 is not set in the slow mode, the control processor 2 determines whether the wiper switch 5 is set in the intermittent mode (step 35). If the wiper switch 5 is set in the intermittent mode, the control processor 2 checks if the rising of a signal, at the time of switching the wiper switch 5 to the intermittent mode, is detected (step 36), as in the first embodiment.

If the signal rising is not detected, and it is determined that the intermittent mode is set on, the control processor 2 detects and determines the potential at the node N1 (steps 37 and 38). If the potential at the node N1 is equal to, or higher than 2.5 volts, the control processor 2 returns to step 31, and performs the same control sequence as described above. If the potential at the node N1 is less than 2.5 volts, the control processor 2 applies a pulse signal to the base of the transistor TR1 for a predetermined period of time such as 1 millisecond. This pulse signal turns on the transistor TR1, and causes the capacitor C1 to be charged.

Figure 5:
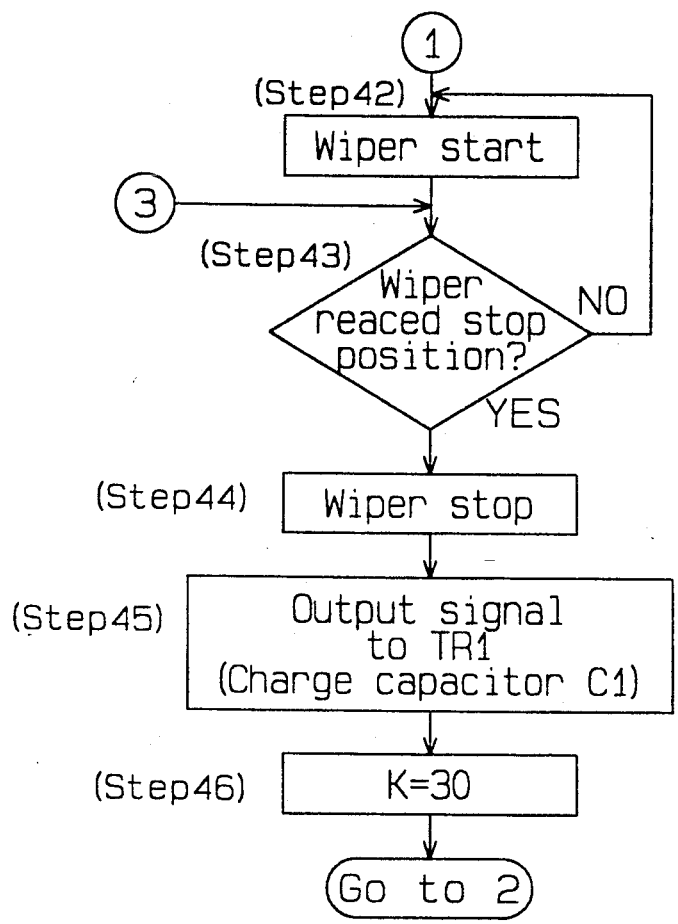

Every time a single pulse signal is sent to the transistor TR1, the control processor 2 decrements the count value K held in the counter 2a (step 40). Then, the control processor 2 determines whether the count value K of the counter 2a has reached "0" (step 41). When the count value K has not reached "0", the control processor 2 returns to step 31 to perform the same control process as described above. When the count value K reaches "0", the control processor 2 causes the motor drive circuit 3 to activate the wiper 7 as illustrated in FIG. 5 (step 42).

Thereafter, the control processor 2 determines whether the activated wiper 7 has reached a predetermined stop position based on the detection signal from the position detector 6 (step 43). When the wiper 7 has reached the predetermined stop position, the control processor 2 causes the wiper 7 to stop (step 44). Through the control sequence from step 42 to step 44, the wiper 7 makes one reciprocative action.

After stopping the wiper 7 at the stop position, the control processor 2 applies a high-level pulse signal to the base of the transistor TR1, for a predetermined period of time (1 ms). This pulse signal turns the transistor TR1 on, and causes the capacitor C1 to be charged (step 45). As a result, the potential at the node N1 returns to a predetermined high potential (5 volts).

After initializing the count value K of the counter 2a to "30" (step 46), the control processor 2 returns to step 31 again, and repeats the above-described control sequence.

When the signal rising due to the setting of the wiper switch 5 in the intermittent mode is detected in step 36, the control processor 2 promptly advances to step 42, to activate the wiper 7 immediately. Thereafter, the control processor 2 controls the wiper 7 according to the procedures starting from step 43, as described above.

It may be determined in step 35, as in step 5 in the first embodiment, that the wiper switch 5 is not set in the intermittent mode. The control processor 2 then determines whether the wiper motor 4 is stopped, and further determines whether the wiper 7 is in the predetermined stop position, based on the detection signal from the position detector 6 (step 47).

If the wiper motor 4 is not operational, and the wiper 7 is stopped in the predetermined stop position, the control processor 2 returns to step 31 to repeat the above-described control sequence. When the wiper 7 is not in the predetermined stop position, the control processor 2 controls the wiper 7 according to the procedures starting from step 43, and stops the wiper 7 at the predetermined stop position.

Briefly, according to the second embodiment, the wiper can be driven intermittently with predetermined inactive durations. Particularly, the intermittent inactive duration of the wiper can be adjusted by altering the initial count value held in the counter 2a. In addition, the intermittent inactive duration of the wiper can be adjusted more accurately by varying the resistance of the variable resistor VR1.

Further, since the second embodiment can count the number of times the capacitor C1 is charged by means of the counter 2a, a small-capacity capacitor can be used. A smaller size capacitor will contribute to the overall reduction in size of the wiper controller.

According to the first and second embodiments, the resistor R2 and the variable resistor VR1 accurately maintain the time needed to discharge the electric charges stored in the capacitor C1, regardless of the repetitive charging/discharging of the capacitor C1. Therefore, the inactive durations of the wiper 7 in the intermittent action can always be kept constant.

Although only two embodiments of the present invention has been described herein, it should be apparent to those skilled in the art that the present invention may be embodied in many other specific forms without departing from the spirit or scope of the invention. Particularly, it should be understood that the value for the potential discrimination in step 8 or step 38 and the initial value for the count value K can be changed as needed.

In the first and second embodiments, the intermittent inactive time of the wiper is determined on the basis of the positive side potential of the capacitor C1 in a discharging action. The intermittent inactive time may be determined based on the positive side potential of the capacitor which is being charged. A specific example based on such an idea is illustrated in FIG. 8.

Figure 8:
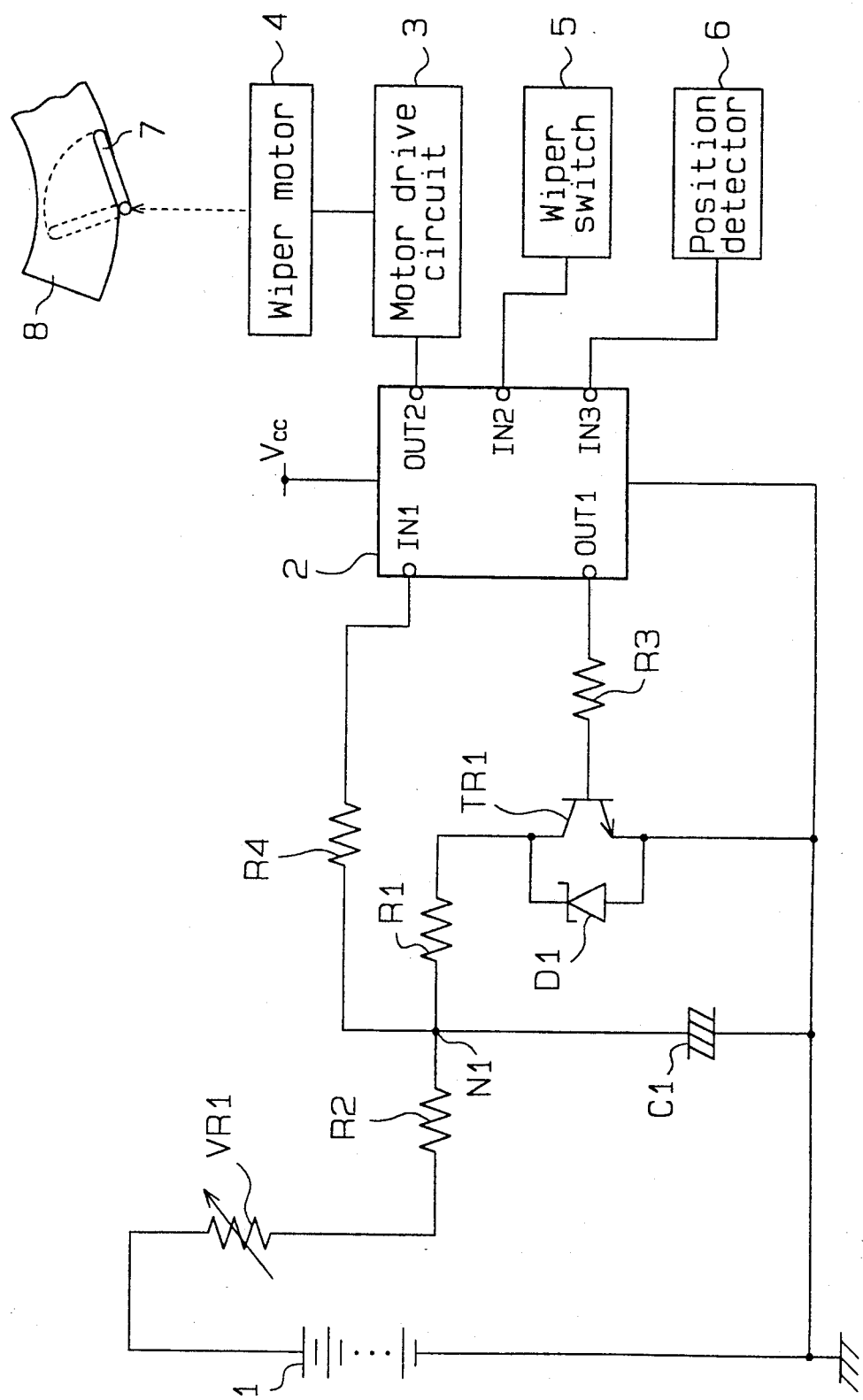
FIG. 8 illustrates a circuit diagram for use in a third embodiment of the wiper controller.
Figure 9:
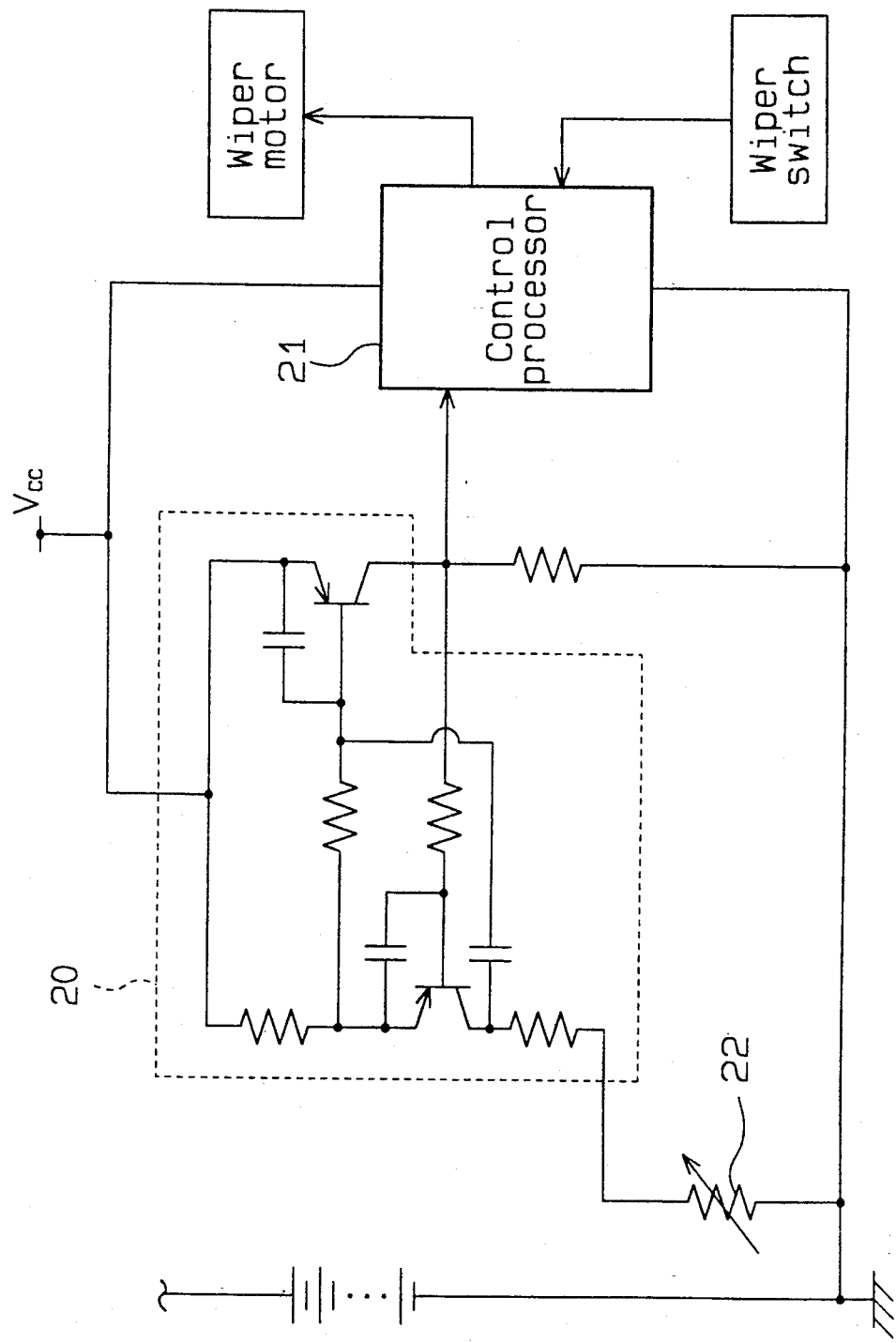
FIG. 9 illustrates a circuit diagram of a conventional wiper controller.

As shown in FIG. 8, the variable resistor VR1, resistor R2 and capacitor C1 are connected in series to the battery 1, while the resistor R1 and transistor TR1 are provided in parallel to the capacitor C1. The capacitor C1 is charged by the battery 1 via the variable resistor VR1 and resistor R2. When a pulse signal is sent out to the base of the transistor TR1, from the output terminal OUT1 of the control processor 2, and the transistor TR1 is turned on for a predetermined period of time, the capacitor C1 starts discharging. This discharging action drops the potential at the node N1 to a predetermined low potential.

After the transistor TR1 is turned off, the capacitor C1 is charged by the battery 1 via the variable resistor VR1 and resistor R2. As a result, the potential at the node N1 rises. The inactive time of the wiper motor 4 can therefore be determined based on the time from a point at which the output of the control signal from the output terminal OUT1 has started or ended, to a point when the potential at the node N1 rises to a predetermined discrimination potential. In this case, the intermittent inactive time can be altered by adjusting the variable resistor VR1, as in the first embodiment.

The circuit structure shown in FIG. 8 can also be applied to the second embodiment in which the control processor 2 has the counter 2a.

The present examples and embodiments are to be considered as illustrative and not restrictive, and the invention is not to be limited to the details given herein.

What is claimed is:

1. A wiper controller for intermittently driving a wiper, comprising:
   a power source;
   drive means for driving the wiper;
   energy storage means having one potential detecting point;
   charge means, connected between said energy storage means and said power source, for charging said energy storage means, said charge means including switch means for disconnecting said charge means;
   discharge means, connected to said energy storage means, for discharging said energy storage means, said discharge means including timer means for controlling the discharge time of said energy storage means;
   drive control means for controlling said drive means, based on the potential of said detecting point, for permitting the wiper to make one reciprocative action when the potential of said detecting point reaches a predetermined value; and
   switch control means for controlling said switch means to set said switch means on for a predetermined period of time, after one reciprocative action of the wiper is completed, thereby to initialize the potential of said detecting point.

2. The wiper controller according to claim 1, wherein said energy storage means includes a capacitor.

3. The wiper controller according to claim 2, wherein said detecting point is a node located on a positive polarity side of said capacitor, to connect said energy storage means to said discharge means.

4. The wiper controller according to claim 1, wherein said timer meams includes a variable resistor.

5. The wiper controller according to claim 1, wherein said drive control means includes:
   potential detecting means for detecting the potential of said detecting point; and
   position detecting means for detecting the position of the wiper.

6. A wiper controller for intermittently driving a wiper, comprising:
   a power source;
   drive means for driving the wiper;
   energy storage means having one potential detecting point;
   charge means, connected between said energy storage means and said power source, for charging said energy storage means, said charge means including timer means for controlling the charge time of said energy storage means;
   discharge means, connected to said energy storage means, for discharging said energy storage means, said discharge means including switch means for disconnecting said discharge means;
   drive control means for controlling said drive means, based on the potential of said detecting point, for permitting the wiper to make one reciprocative action when the potential of said detecting point reaches a predetermined value; and switch control means for controlling said switch means to set said switch means on for a predetermined period of time, after one reciprocative action of the wiper is completed, thereby to initialize the potential of said detecting point.

7. The wiper controller according to claim 6, wherein said energy storage means includes a capacitor.

8. The wiper controller according to claim 7, wherein said detecting point is a node located on a positive polarity side of said capacitor, to connect said energy storage means to said discharge means.

9. The wiper controller according to claim 6, wherein said timer meams includes a variable resistor.

10. The wiper controller according to claim 6, wherein said drive control means includes:
  potential detecting means for detecting the potential of said detecting point; and
  position detecting means for detecting the position of the wiper.

11. A wiper controller for intermittently driving a wiper, comprising:
  a power source;
  drive means for driving the wiper;
  energy storage means having one potential detecting point;
  charge means, connected between said energy storage means and said power source, for charging said energy storage means, said charge means including switch means for disconnecting said charge means;
  discharge means, connected to said energy storage means, for discharging said energy storage means, said discharge means including timer means for controlling the discharge time of said energy storage means;
  switch control means for controlling said switch means, based on the potential of said detecting point, for setting said switch means on for a predetermined period of time, when the potential of said detecting point reaches a predetermined value, thereby to initialize the potential of said detecting point;
  counting means for counting the number of times said switch means is set on by said switch control means; and
  drive control means for controlling said drive means, based on a count value of said counting means, so as to permit the wiper to make one reciprocative action when said count value reaches a predetermined value.

12. The wiper controller according to claim 11, wherein said energy storage means includes a capacitor.

13. The wiper controller according to claim 12, wherein said detecting point is a node located on a positive polarity side of said capacitor, to connect said energy storage means to said discharge means.

14. The wiper controller according to claim 11, wherein said timer means includes a variable resistor.

15. The wiper controller according to claim 11,
  wherein said switch control means includes potential detecting means for detecting the potential of said detecting point; and
  wherein said drive control means includes position detecting means for detecting the position of the wiper.

16. A wiper controller for intermittently driving a wiper, comprising:
  a power source;
  drive means for driving the wiper;
  energy storage means having one potential detecting point;
  charge means, connected between said energy storage means and said power source, for charging said energy storage means, said charge means including timer means for controlling the charge time of said energy storage means;
  discharge means, connected to said energy storage means, for discharging said energy storage means, said discharge means including switch means for disconnecting said discharge means;
  switch control means for controlling said switch means, based on the potential of said detecting point, for setting said switch means on for a predetermined period of time, when the potential of said detecting point reaches a predetermined value, thereby to initialize the potential of said detecting point;
  counting means for counting the number of times said switch means is set on by said switch control means; and
  drive control means for controlling said drive means, based on a count value of said counting means, so as to permit the wiper to make one reciprocative action when said count value reaches a predetermined value.

17. The wiper controller according to claim 16, wherein said energy storage means includes a capacitor.

18. The wiper controller according to claim 17, wherein said detecting point is a node located on a positive polarity side of said capacitor, to connect said energy storage means to said discharge means.

19. The wiper controller according to claim 16, wherein said timer means includes a variable resistor.

20. The wiper controller according to claim 16,
  wherein said switch control means includes potential detecting means for detecting the potential of said detecting point; and
  wherein said drive control means includes position detecting means for detecting the position of the wiper.

* * * * *